(12) United States Patent
Krambrock

(10) Patent No.: US 6,971,786 B2
(45) Date of Patent: Dec. 6, 2005

(54) METHOD FOR CONVEYING A SOLID SUBSTANCE

(75) Inventor: Wolfgang Krambrock, Vogt (DE)

(73) Assignee: Zeppelin Silo- und Apparatetechnik GmbH, Friedrichshafen (DE)

( * ) Notice: Subject to any disclaimer, the term of this patent is extended or adjusted under 35 U.S.C. 154(b) by 95 days.

(21) Appl. No.: 10/312,616

(22) PCT Filed: Jun. 26, 2001

(86) PCT No.: PCT/DE01/02348

§ 371 (c)(1),
(2), (4) Date: Mar. 27, 2003

(87) PCT Pub. No.: WO02/00535

PCT Pub. Date: Jan. 3, 2002

(65) Prior Publication Data

US 2004/0197154 A1 Oct. 7, 2004

(30) Foreign Application Priority Data

Jun. 28, 2000 (DE) .................. 100 30 624

(51) Int. Cl.[7] .......................................... B01F 15/00
(52) U.S. Cl. ................. 366/165.1; 406/92; 406/144; 406/136
(58) Field of Search .................... 406/92, 141, 144, 406/197, 136, 137; 366/165.1

(56) References Cited

U.S. PATENT DOCUMENTS

| 2,686,085 | A | | 8/1954 | Odell | |
|---|---|---|---|---|---|
| 2,794,686 | A | * | 6/1957 | Anselman et al. | 406/95 |
| 3,230,016 | A | * | 1/1966 | Gilbert et al. | 406/124 |
| 3,482,882 | A | * | 12/1969 | Sem | 406/137 |
| 4,005,806 | A | * | 2/1977 | Baldwin | 406/125 |
| 4,125,331 | A | * | 11/1978 | Chisholm | 366/21 |
| 4,451,184 | A | * | 5/1984 | Mitchell | 406/105 |
| 4,884,925 | A | * | 12/1989 | Kemp et al. | 406/109 |
| 5,556,238 | A | * | 9/1996 | Chinh | 406/136 |
| 5,634,713 | A | * | 6/1997 | Abe | 366/102 |
| 6,182,681 | B1 | * | 2/2001 | Robertson et al. | 137/268 |

FOREIGN PATENT DOCUMENTS

| DE | 31 46 915 C2 | 11/1985 |
|---|---|---|
| DE | 39 20 298 A1 | 12/1989 |
| DE | 44 42 337 C2 | 9/1996 |
| DE | 39 28 174 C2 | 3/1998 |
| DE | 197 55 732 C2 | 1/2000 |
| EP | 0358 354 A | 3/1990 |
| FR | 953 129 A | 5/1949 |
| GB | 1 347 614 A | 2/1974 |

* cited by examiner

Primary Examiner—Joe Dillion, Jr.
(74) Attorney, Agent, or Firm—Breneman & Georges

(57) ABSTRACT

The invention relates to a method for conveying a solid (2) in a conveying medium (15), said solid (2) being delivered to a container (5) with outlet (7). The solid (2) is in this case dispersed in the transport liquid (15) without the aid of any mechanically driven parts and is introduced into the conduit (4).

23 Claims, 5 Drawing Sheets

METHOD FOR CONVEYING A SOLID SUBSTANCE

BACKGROUND OF THE INVENTION (1) Field Of The Invention

The invention relates to a method of conveying a solid in a conveying medium (15) in which the solid is delivered to a container having an outlet (7) and the conveying medium that flows into the container generates a downwardly rotating current (17) so that the solid is delivered by the conveying medium to the outlet. More particularly the invention provides for the delivery of a solid in a conveying medium into a container having an outlet so that the downwardly rotating current provides a spiral trajectory directed sharply downward to the outlet of the container.

(2) Description of Related Art Including Information Disclosed Under 37 C.F.R. 1.97 and 1.98

It is known, for example from DE 197 55 732 C2, to transport a dispersion of granules and water through a conduit. To produce a dispersion of solid and liquid, it is known to first introduce the solid into a container filled with liquid and to mix it with the liquid using a mechanical stirrer. The mixture of solid and liquid is then drawn off from the bottom of the container. This is done using a centrifugal pump, which pumps the solid/liquid mixture from its axial inlet opening to the tangential outlet opening and into the conduit.

A disadvantage of this method is that the solid is subjected to mechanical stresses, both by the stirrer arranged in the container and by the pump, and these stresses lead to undesired attrition of the solid and/or to damage of sensitive solid particles. This method has a particularly disadvantageous effect on a solid whose specific weight is less than the specific weight of the liquid which is being used to transport the solid, because the solid of lower specific weight tends, as in a centrifuge, to accumulate at the center of the impeller of the centrifugal pump. The efficiency of the pump deteriorates as a result, because the solid has to be forced away from the center of the impeller. Moreover, the solid is subjected to particularly high mechanical stresses because the individual particles of solid which accumulate at the center of the pump rub against one another. In the container too, the solid of lower specific weight is subjected to increased stress because the mechanical stirrer forces it toward the discharge opening at the bottom counter to the lifting force.

BRIEF SUMMARY OF THE INVENTION

The object of the invention is to develop a method in which the solid is dispersed in the transport liquid and introduced into the conduit without the aid of mechanically driven parts, and which method requires minimum maintenance and in particular allows solids of lower specific weight to be conveyed hydraulically without high mechanical stresses.

Starting from the features of the method of conveying a solid in a conveying medium delivered to a container with an outlet this object is achieved, according to the invention, by the generation of a downwardly rotating current so that the solid is delivered to the outlet by the conveying medium. Advantageous and preferred developments include the method of utilizing the medium to generate the rotating current to flow tangentially as much as possible and delivering the solid through a metering device and utilizing solids of greater, lesser and equal density to the conveying medium and other objects and advantages as will become apparent to those skilled in the art.

In this method, the conveying medium, for example water, flowing into the container designed as a sender container generates a downwardly rotating current, and the solid is delivered by the conveying medium to the outlet. With the conveying medium being carried in a spiral trajectory directed sharply downward to the outlet, the solid which impinges on the conveying medium is entrained by said conveying medium and leaves the sender container together with the conveying medium and passes into a conduit. No mechanism of movement is needed in the sender container in order to produce this kind of current, and, accordingly, there is no contact causing attrition and stresses between the individual particles of the solid and moving mechanical components, for example a stirrer or an impeller of a pump.

By generating the current using a conveying medium which flows in tangentially to the greatest possible extent, it is possible to generate the current in the container without structural space being needed for this purpose in the container.

Feeding the solid into the container via a metering device allows conveying medium and solid to be exactly adapted to each other and, by this means, it is possible to obtain a ratio of liquid to solid, in the mixture of solid and liquid, which is optimum for hydraulic delivery.

In an advantageous embodiment of the subject of the invention, it is possible to convey solids whose density is less than or greater than or approximately the same as the density of the conveying medium. In this way, a very wide variety of solids can be conveyed with just one method, and the method does not have to be modified to convey a solid of different density.

By generating a current with a pumping action, the mechanical pump for maintaining the circulation of the conveying medium can be arranged at a location where it only has to convey pure conveying medium. Thus, irrespective of the solid which is to be conveyed, the pump can be optimized for conveying a specific conveying medium.

Because the conveying medium present in the sender container is driven by the conveying medium which flows anew into the sender container, the direction of rotation of the conveying medium in the sender container can be generated and maintained solely by the flow energy of the inflowing conveying medium.

The subject of the invention also proposes delivering the stream of conveying medium to an outlet along a spiral trajectory of an in particular rotationally symmetrical and in particular tapering sender container. A kind of cyclone thus develops in the container, which cyclone, in contrast to a cyclone separator, has only one outlet. In other words, the flow-generated rotation of the conveying medium in the container results in the formation of a vortex which flows off into one outlet.

In an advantageous embodiment of the subject of the invention, the sender container is designed tapering toward the outlet. The conical design of the sender container favors the formation of a flow of liquid along a narrowing spiral trajectory, because this flow of liquid is guided by the container wall.

It is advantageous if the conveying medium present as a liquid flows into the container, via a delivery nozzle, approximately parallel to the wall of the container and approximately perpendicular to a container axis. This ensures that the flow of liquid seen as a whole follows the wall of the container like an annular peripheral layer and is guided by said wall. The angle of inclination of the spiral trajectory can be influenced by the angle which the delivery nozzle forms with a plane extending perpendicular to the longitudinal axis of the container.

According to a particular embodiment of the method according to the invention, the solid, which for example can be granules of plastic, is introduced into the sender container via a star feeder. In this way, it is also possible to work using a sender container in whose interior the pressure is elevated in relation to the ambient pressure.

According to the invention, it is further provided for the solid to be delivered to the container in an area through which the conveying medium does not flow. To this end, it suffices for the container to have a simple opening through which solid is delivered.

It is particularly advantageous to deliver the solid specifically to a hollow cone which is formed by the conveying medium moving on a spiral trajectory, because the entire jacket surface of the hollow cone is available as a delivery surface for the solid and the solid is conveyed from the conical jacket surface to the outlet or to the container axis.

In a particular embodiment of the subject of the invention, the solid is delivered as a solid/liquid mixture to the conveying medium. In this way it is possible also to convey solids which are already present as a solid/liquid mixture.

In a preferred embodiment, the device according to the invention has a container which narrows toward the outlet and comprises a delivery nozzle for a liquid conveying medium, which nozzle is oriented substantially perpendicular to a main axis of the container and parallel to the container wall. With a delivery nozzle arranged in this way, it is easily possible to produce a flow of liquid running on a spiral trajectory along the container wall to the outlet.

In a further advantageous embodiment of the device, a plurality of delivery nozzles are arranged on the container wall and preferably lie in a plane perpendicular to the longitudinal axis of the container. In this way it is possible to have larger quantities of liquid flowing into the container, which quantities of liquid are guided by the container wall and combine to form a common, suctioning spiral flow.

It is also advantageous to define the profile of the current in the sender container by changing the cross section of admission. In this way, the delivery installation can be adjusted for conveying different solids.

In a modification of the invention, the level of the conveying medium in the sender container is adjusted by means of a gas pressure regulator. In this way it is possible to influence the filling level in the container and ensure that the conveying medium does not rise into the metering unit arranged above the container.

BRIEF DESCRIPTION OF THE SEVERAL VIEWS OF THE DRAWING(S)

Further details of the invention are described with reference to the drawing which shows diagrammatic views of illustrative embodiments. In the drawing.

DETAILED DESCRIPTION OF THE INVENTION

Figure 1:
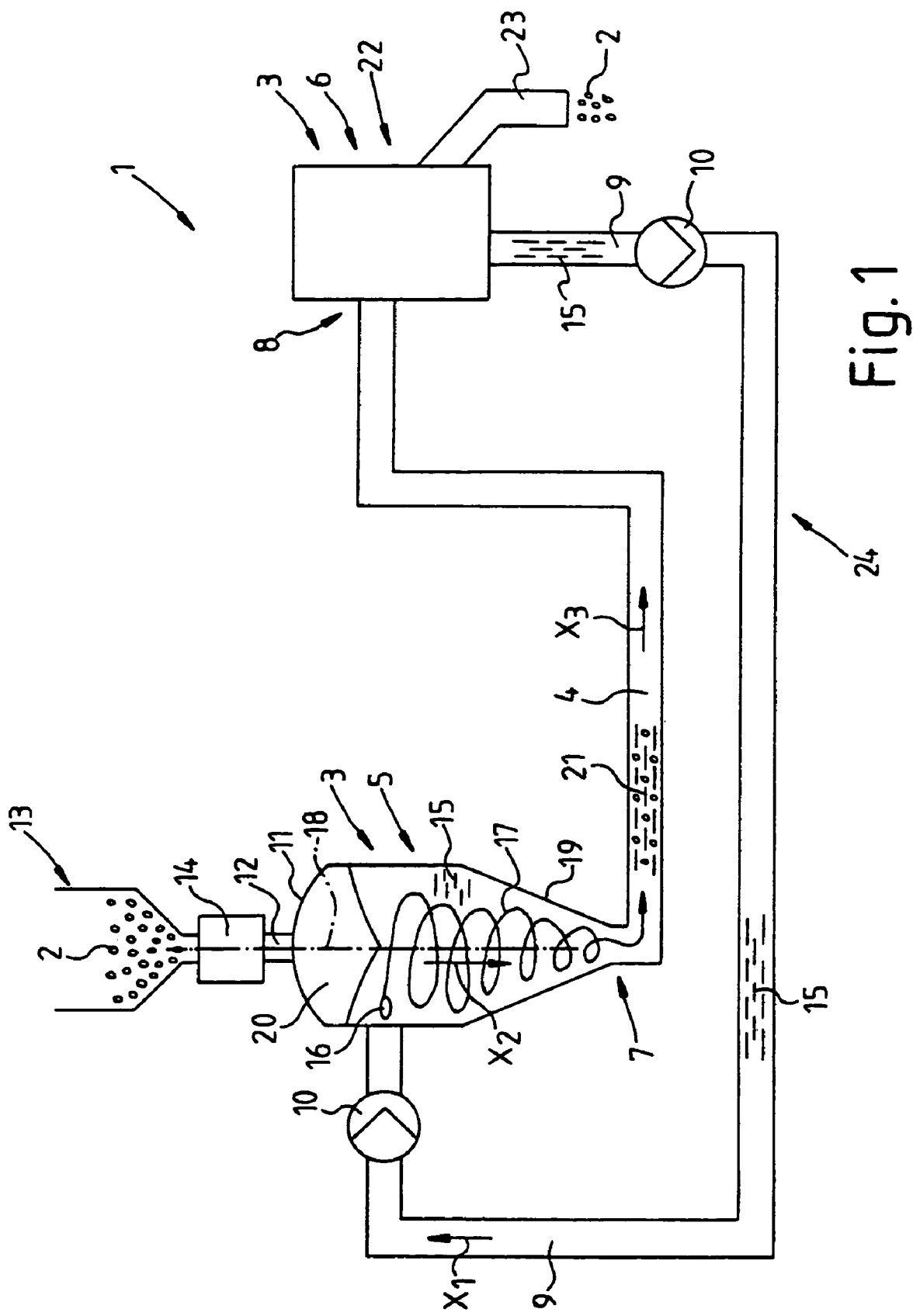
FIG. 1 shows a diagrammatic view of an installation for hydraulic conveying.

FIG. 1 shows a diagrammatic view of an installation 1 for hydraulic conveying of solid 2. The installation 1 consists principally of two reservoirs 3 which are connected to one another via a conduit 4, one reservoir 3 being designed as the container 5, and the other reservoir 3 being designed as a receiver container 6. The container 5 opens into the conduit 4 via an outlet 7. This conduit 4 opens into the receiver container 6 via an inlet 8. The container 5 is connected to the receiver container 6 via a delivery line 9 in which motor-driven pumps 10 are arranged. An admission line 12 opening into a container lid 11 also connects the container 5 to a storage container 13 in which the solid 2 is held in readiness. The solid 2 is delivered to the container 5 via a metering device 14. Conveying medium 15 present in the admission line 9 is conveyed with the aid of the pumps 10 in arrow direction $x_1$ and passed into the conveying medium 15 located in the container 5 via a nozzle 16 which is arranged tangentially with respect to the container 5 of round cross section. The introduction of the conveying medium 15 into the container 5 creates a current 17 in the latter, which current rotates about a container axis 18 to the outlet 7, said outlet 7 being arranged in a conically tapering base 19 of the container 5. The solid 2 which is of lower specific weight than the conveying medium 15 is shaken by the metering device 14 through a free space 20 and onto the conveying medium 15 located in the container 5 and is guided by the current 17, as in a centrifuge, toward the container axis 18, and drawn in arrow direction $x_2$ to the outlet 7 of the container 5.

The solid 2 leaves the outlet 7, together with the conveying medium 15, as a solid/liquid mixture 21 which has been generated in the current 17 and passes through the conduit 4 in arrow direction $X_3$. The solid/liquid mixture 21 passes through the inlet 8 into the receiver container 6 which is designed as a separator 22. In the separator 22, the solid/liquid mixture 21 is divided into solid 2 and conveying medium 15. The solid 2 leaves the separator 22 by way of a pipe 23. The conveying medium 15 passes into the delivery line 9 in which is it conveyed back to the container 5 by means of the pumps 10 and in this way moves in a conveying medium circulation 24.

According to an alternative embodiment which is not shown, provision is made for the receiver container to be designed as a receiver/sender container, in which case the conveying medium is at least partially removed from the solid in an upper part of the container, and, in a lower part of the container, a flow of liquid is formed by inflowing conveying medium, analogously to the sender container, and the solid or the solid/liquid mixture can be pumped into a further container via this flow of liquid. Of course, the separation of the suspension and the further conveying can also take place in separate containers. Large conveying distances can thus be achieved by arranging sender and receiver containers in succession. If appropriate, intermediate reservoirs can also be provided.

Figure 2:
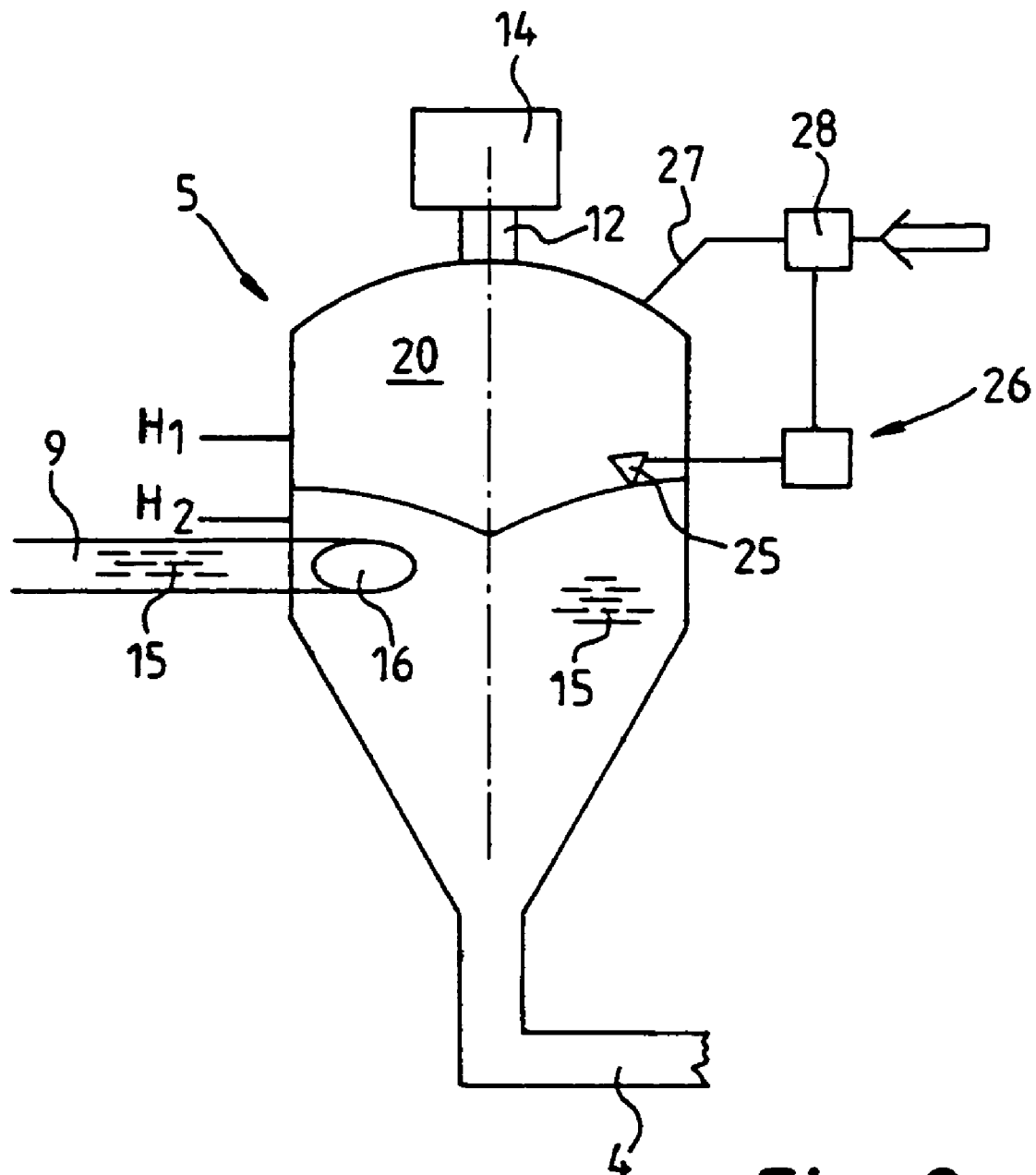
FIG. 2 shows a diagrammatic cross section of a sender container.

FIG. 2 shows a diagrammatic cross section of a container 5 which serves as a dispersing container. A level 25 of a conveying medium 15 present in the container 5 is maintained substantially constant by a gas pressure regulator 26.

If the level 25 of the conveying medium 15 rises above a filling level $H_1$, the pressure in a free space 20 of the container is then increased by means of the gas pressure regulator 26, so that continued flow of conveying medium 15 from a delivery line 9 through a nozzle 16 into the container 5 is at least partly prevented. The free space 20 is acted upon by gas via a gas line 27 and via a control valve 28 which is assigned to the gas line 27 and is regulated by the gas pressure regulator 26. If the level 25 of the conveying medium 15 drops below a filling level $H_2$, the pressure in a free space 20 of the container 5 is then reduced by means of the gas pressure regulator 26, so that there is less resistance to the conveying medium 15 flowing from the delivery line 9.

Figure 3:
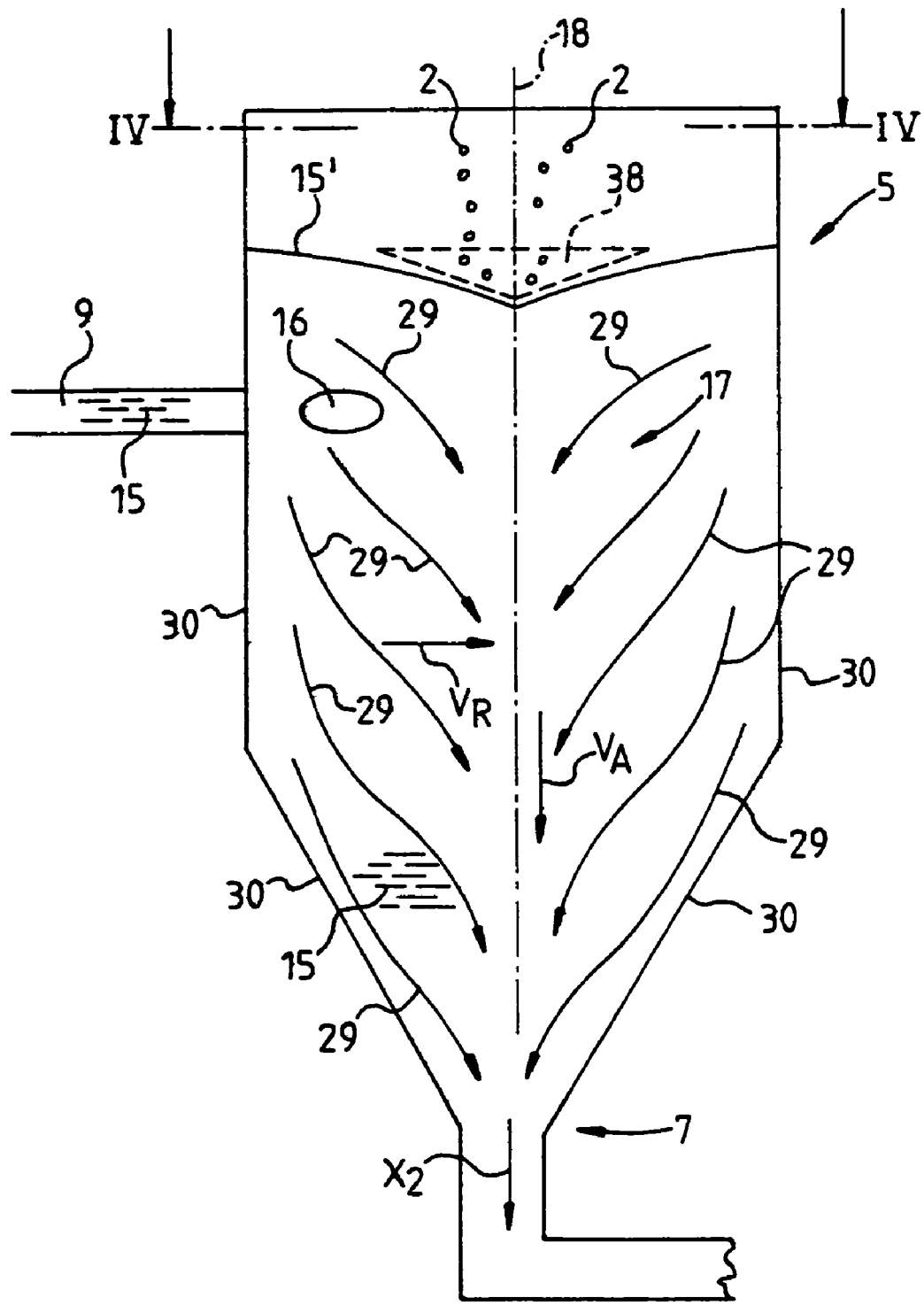
FIG. 3 shows a diagrammatic cross section of a further sender container.

FIG. 3 shows a diagrammatic cross section of a further container 5. Arrows 29 indicate the typical profile of a current 17 generated by a conveying medium 15 passing tangentially from a delivery line 9 into the container 5 via a nozzle 16. The conveying medium 15 flows from one container wall 30 toward a container axis 18, at the same time moving in an arrow direction $x_2$ toward an outlet 7 of the container 5. Thus, the conveying medium 15 has an axial component of velocity $V_A$ and a radial component of velocity $V_R$. By means of the current 17, the conveying medium 15 forms, on one surface 15', a cone-shaped funnel 38 by which the solid 2 impinging on the surface 15' is already guided to the container axis 18 or in the direction of the outlet 7.

Figure 4:
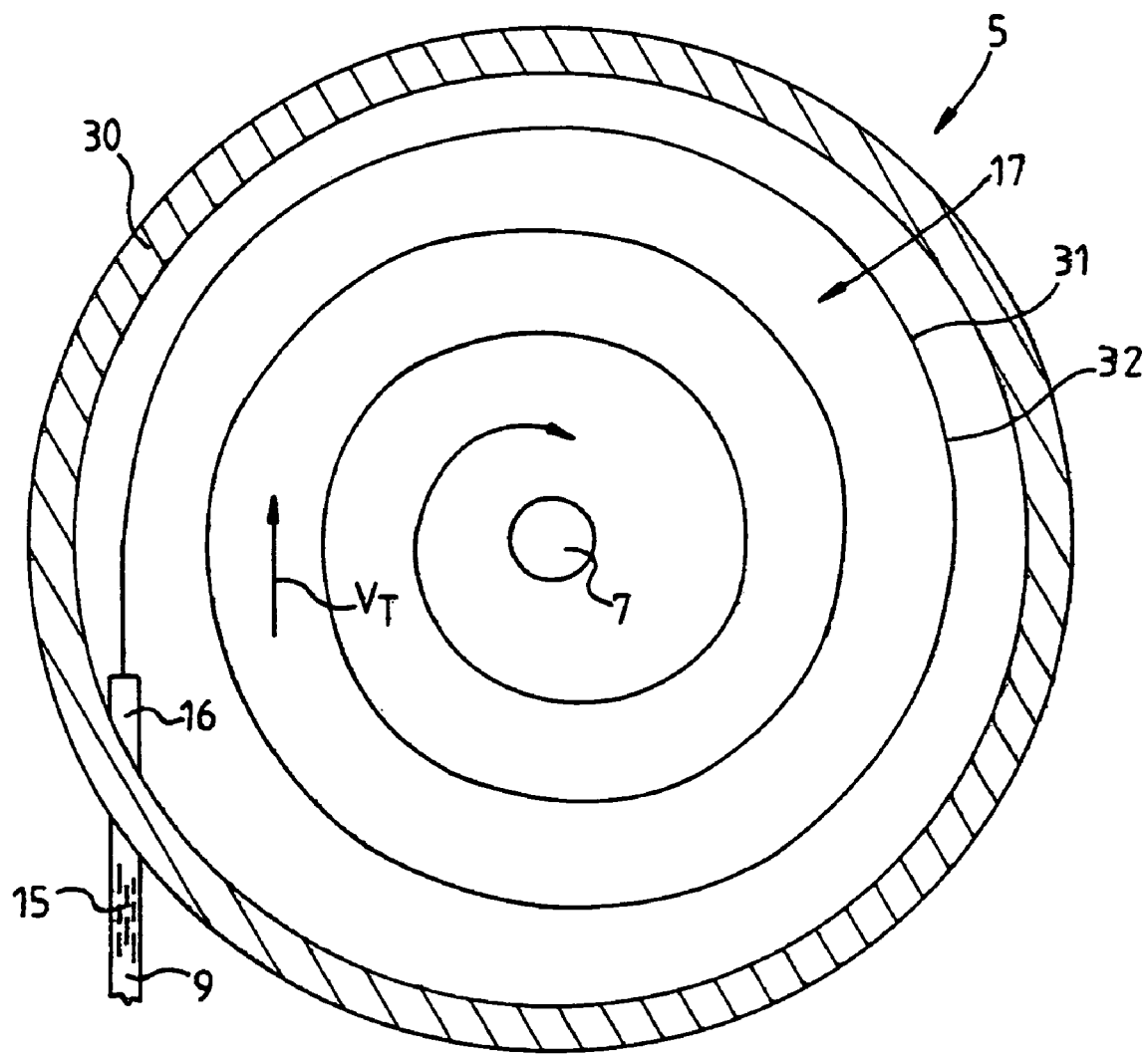
FIG. 4 shows a cross section, along the line IV—IV, through the sender container shown in FIG. 3.

FIG. 4 shows a diagrammatic cross section of the container 5 shown in FIG. 3, with an arrow 31 symbolizing the current 17 formed in this container 5. The conveying medium 15 delivered via the delivery line 9 and through the nozzle 16 flows on a spiral trajectory 32 along the container wall 30 toward the outlet 7 and thus has a tangential component of velocity $V_T$. The conveying medium 15 and the solid 2 have axial, radial and tangential components of velocity $V_A$, $V_R$, $V_T$, with the velocity increasing toward the outlet 7.

Figure 5:
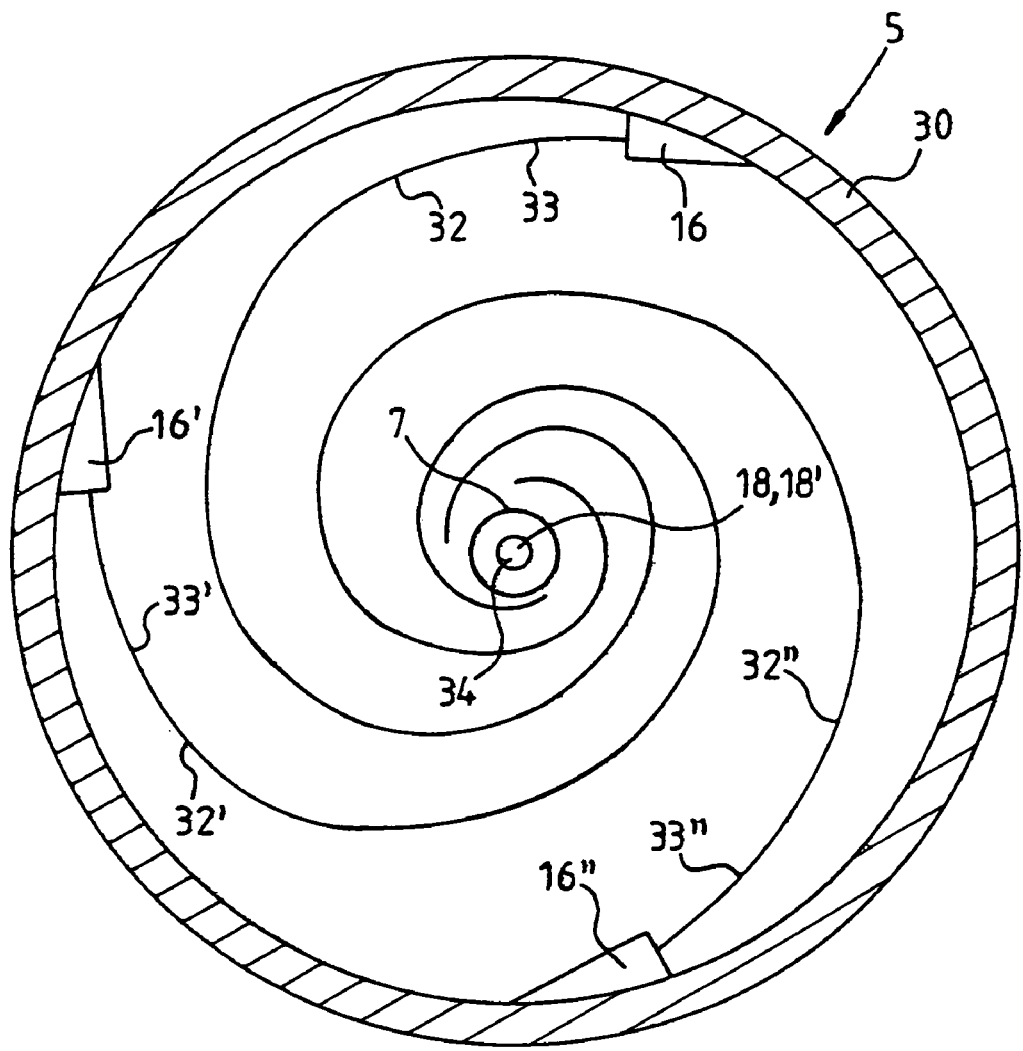
FIG. 5 shows a cross section through a further sender container.

FIG. 5 shows a diagrammatic cross section of a further container 5. In said container 5, there are three nozzles 16 through 16" which are arranged at the same height on a container wall 30. The nozzles 16 through 16" generate jets 33 through 33" which run on spiral trajectories 32 through 32" in the direction of a container axis 18 or spiral axis 18' (indicated by an arrow end 34) to an outlet 7.

Figure 6:
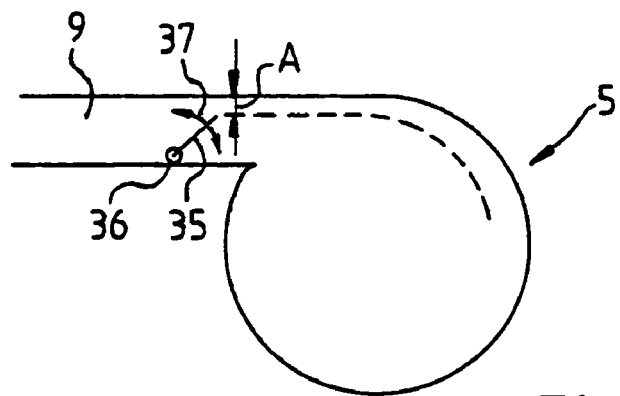
FIG. 6 shows a cross section through a sender container with an adjustable cross section of admission.

FIG. 6 shows a cross section of a container 5 with a delivery line 9 which has a nozzle 16 with a variable cross section of admission A. The cross section of admission A can be adjusted by a flap 35 which can turn about a hinge 36 in arrow directions 37. Depending on the difference in density between solid 2 and conveying medium 15, the components of velocity $V_A$, $V_R$, $V_T$ can be varied by the configuration of the cross section of admission A.

The illustrative embodiments have been described on the assumption that the conveying medium used is water and that the material to be conveyed is plastic granules which are lighter than or about equally as light as water.

The invention is not limited to the illustrative embodiments shown or described. Instead, it includes developments of the invention within the scope of the patent claims. In particular, the invention also provides for solid to be conveyed which has a heavier specific weight than the conveying medium. In this case, the rotating current ensures that the solid is moving in rotation before it passes through the outlet of the container, by which means blockages are effectively counteracted.

In a further alternative embodiment which is not shown, the spiral current is formed in a pipe, preferably by guide plates, and the solid is delivered to the rotating flow of liquid by way of, for example, a conduit or a star feeder.

LIST OF REFERENCE NUMBERS 1 installation
2 solid
3 reservoir
4 conduit
5 container
6 receiver container
7 outlet
8 inlet
9 delivery line
10 pump
11 container lid
12 delivery line
13 storage reservoir
14 metering device
15 conveying medium
15' surface
16 nozzle
17 current
18 container axis
19 base
20 free space
21 solid/liquid mixture
22 separator
23 pipe
24 conveying medium circuit
25 level
26 gas pressure regulator
27 gas line
28 control valve
29 arrow
30 container wall
31 arrow
32 spiral trajectory
33 jet
34 arrow end
35 flap
36 hinge
37 arrow direction
38 funnel

What is claimed is:

1. A method for conveying a solid in a conveying medium 15, said solid 2 being delivered to a container 5 with outlet 7, and the conveying medium 15 flowing into the container 5 generating a downwardly rotating current 17 and separately delivering a solid 2 in a separate stream into the conveying medium 15 to the outlet 7, wherein the improvement comprises the step of separately controlling the pressure in a free space 20 in the container 5 above the conveying medium delivery line 9 in relation to the fluid level environment in said container 5 resulting from the generation of said downwardly rotating current and the delivering of said separate stream of said solid into said container.

2. A device for conveying a solid in a conveying medium, having a sender container 5 with outlet 7, means for generating a downwardly rotating current 17 in the conveying medium, a separate feeder device feeding a separate stream of solid to the conveying medium in the sender container 5 and means for controlling the pressure and level of free space 20 in said sender container 5 separate from the fluid pressure exerted by said downwardly rotating current and said separate stream of solid in said sender container.

3. The method as claimed in claim 1, wherein the downwardly rotating current (17) is generated by the conveying medium (15) flowing tangentially to a wall of said container.

4. The method as claimed in claim 1 further comprising the step of delivering the solid (2) to the container (5) from above through a metering device (14).

5. The method as claimed in claim 1 further comprising the step of having the density of the solid (2) less than or greater than or approximately the same as the density of the conveying medium (15).

6. The method as claimed in claim 1 further comprising the step of pumping to convey the solid (2) and the conveying medium (15) or a solid/liquid mixture (21) through only the conveying medium (15).

7. The method as claimed in claim 1 further comprising the step of setting the conveying medium (15) present in the container (5) in a rotational movement by a pump for pumping the conveying medium (15) which flows into the container (5).

8. The method as claimed in claim 1 or 4 further comprising the step of delivering the current (17) of the conveying medium (15) to an outlet (7) along a spiral trajectory (32) of a symmetrically tapered container (5).

9. The method as claimed in claim 1 wherein said step of generating a downwardly rotating current is achieved by a nozzle (16), disposed approximately parallel to the container wall (30) and approximately perpendicular to a central container axis (18).

10. The method as claimed in claim 1 wherein said step of separately metering said solid is separately metered by a positive displacement feeder.

11. The method as claimed in claim 1 wherein said step of separately metering the solid (2) into the container (5) is achieved by separately metering said solid in an area (20) through which the conveying medium (15) does not flow.

12. The method as claimed in claim 1 wherein said step of separately metering said solid (2) is achieved by metering said solid (2) into a hollow cone (38) formed by the conveying medium (15).

13. The method as claimed in claim 1 wherein the solid (2) is separately metered as a solid/liquid mixture (21) to the conveying medium (15).

14. The method as claimed in claim 9 further comprising the step of changing the flow profile of the current (17) in the container (5) by a change in the size of the opening of said nozzle.

15. The method as claimed in claim 1 wherein the step of setting a level (25) of the conveying medium (15) in the container (5) is achieved by gas pressure.

16. The device as claimed in claim 2 wherein said separate feeder device feeds the solid (2) through a metering device disposed above the sender container (5).

17. The device as claimed in claim 2 wherein said separate feeder device is a pump (10) for conveying the solid (2) and said means for generating a downwardly rotation current in the conveying medium (15) is a pump.

18. The device as claimed in claim 2 wherein the sender container (5) is of a symmetrically tapered configuration.

19. The device as claimed in claim 2 further comprising a nozzle (16), disposed approximately parallel to the sender container wall (30) and approximately perpendicular to a central sender container axis (18).

20. The device as claimed in claim 2 wherein said separate feeder device is a positive displacement feeder for feeding the solid (2) into the sender container (5).

21. The device as claimed in claim 2 further comprising a gas pressure regulator (26) for controlling said means for controlling pressure in said sender container to set the level (25) of the conveying medium (15) in the sender container (5).

22. A method of conveying a solid comprising:
(a) pumping a liquid conveying medium into a container pressurized in relation to the ambient environment with an outlet in an axis substantially perpendicular to the central axis of the container through a nozzle disposed intermediate the ends of said container and substantially parallel to a wall of said container to generate a rotating current in said container toward said outlet of said container;
(b) separately metering a solid in a separate stream into said container in an axis substantially parallel to the central axis of said container;
(c) controlling the pressure in a free space above said nozzle in said pressurized container by a separate means for controlling the pressure in said pressurized container separate from said steps of pumping and separately metering; and
(c) setting the level of the liquid conveying medium in relation to the level of free space in the said pressurized container by a gas pressure regulator to control said separate means for controlling pressure in said pressurized container.

23. The method of claim 22 further comprising the step of regulating the pressure in said free space with said separate means for controlling pressure in said pressurized container.

* * * * *